United States Patent [19]

Kabaya et al.

[11] Patent Number: 4,840,488
[45] Date of Patent: Jun. 20, 1989

[54] PHOTOELECTRIC TYPE DISPLACEMENT DETECTING INSTRUMENT

[75] Inventors: Yoshihiko Kabaya, Sagamihara; Naofumi Yasuda, Ichikawa; Toshihiro Omi, Kawasaki, all of Japan

[73] Assignee: Mitutoyo Mfg. Co., Ltd., Tokyo, Japan

[21] Appl. No.: 86,627

[22] PCT Filed: Mar. 12, 1987

[86] PCT No.: PCT/JP87/00154
§ 371 Date: Jul. 24, 1987
§ 102(e) Date: Jul. 24, 1987

[87] PCT Pub. No.: WO87/05693
PCT Pub. Date: Sep. 24, 1987

[30] Foreign Application Priority Data

Mar. 14, 1986 [JP] Japan ................. 61-56534
Mar. 14, 1986 [JP] Japan ................. 61-56535
Jun. 25, 1986 [JP] Japan ................ 61-149073
Mar. 6, 1987 [JP] Japan ................. 62-51517
Mar. 6, 1987 [JP] Japan ................. 62-51518

[51] Int. Cl.⁴ .............................. G01D 5/36
[52] U.S. Cl. ..................... 356/374; 33/707
[58] Field of Search .......... 356/374; 250/237 G; 33/125 C; 357/17

[56] References Cited

U.S. PATENT DOCUMENTS 4,019,196 4/1977 Teshimo et al. ................ 357/17
4,340,814 7/1982 DiCiaccio et al. ............ 250/237 G
4,499,374 2/1985 Kabaya ....................... 250/237 G
4,508,965 4/1985 Casciani ..................... 250/237 G

FOREIGN PATENT DOCUMENTS 53-110165 9/1978 Japan.
57-163815 10/1982 Japan.
59-159016 9/1984 Japan.
60-37815 3/1985 Japan.
60-55227 3/1985 Japan.
60-73418 4/1985 Japan.
60-32126 7/1985 Japan.
60-129161 8/1985 Japan.
60-216215 10/1985 Japan.

Primary Examiner—Richard A. Rosenberger
Attorney, Agent, or Firm—Oliff & Berridge

[57] ABSTRACT

A photoelectric type displacement detecting instrument comprising: a main optical lattice formed on a first member; an auxiliary optical lattice formed on a second member; a light emitter for emitting detecting light to the both optical lattices in a direction from the outer side of the second member to the first member; a light receiver opposed to the light emitter, interposing therebetween the both optical lattices, for receiving the detecting light transmitted through the both optical lattices, transducing changes in the value of the received light through the repeat of overlappings due to relative movements between the both optical lattices into electric signals; and an electronic circuit for calculating a relative moving distance between the main optical lattice and the auxiliary optical lattice on the basis of the electric signals. The auxiliary optical lattice is formed into a plurality of parts by a phase dividing frame; the light receiver is divided into a plurality of parts corresponding in number to the parts of the auxiliary optical lattice. The light emitter is of such an arrangement that the light diffused from a light emitting element is reflected in parallel in the direction of the main optical lattice and the auxiliary optical lattice, and transmitted through a surface, where the optical lattices are formed, perpendicularly.

14 Claims, 11 Drawing Sheets

FIG.13
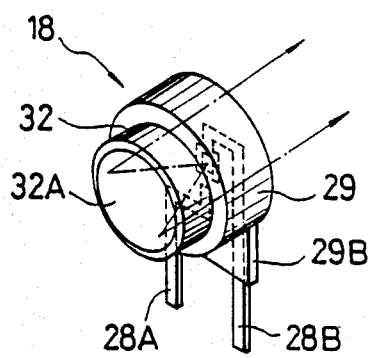
FIG.14
(A)
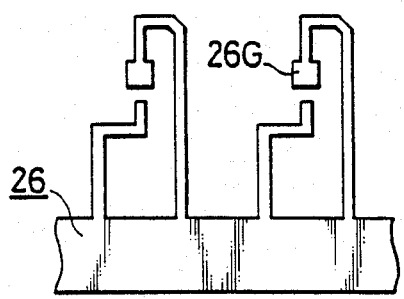
(B)
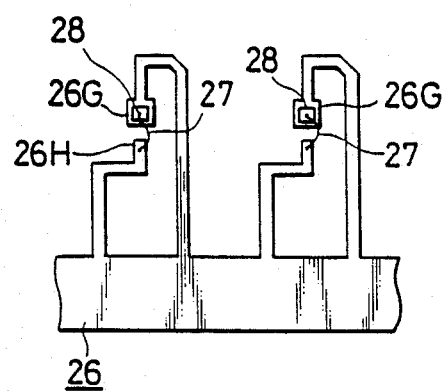
(C)
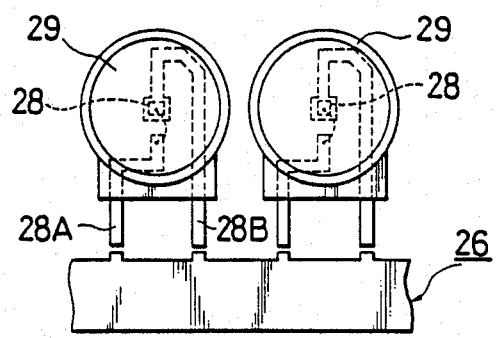
(D)
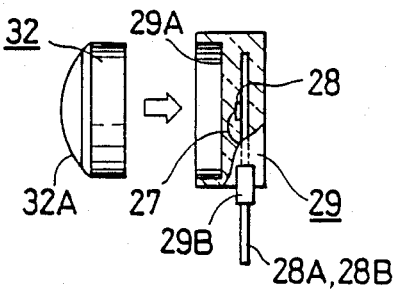

PHOTOELECTRIC TYPE DISPLACEMENT DETECTING INSTRUMENT

TECHNICAL FIELD

This invention relates to photoelectric type displacement detecting instruments and more particularly to improvements in a photoelectric type displacement detecting instrument referred to as a photoelectric type linear encoder, including optical lattices which are dispaced relative to each other, and photoelectric elements.

BACKGROUND ART

There has heretofore been developed a photoelectric type displacement detecting instrument comprising:

a main optical lattice formed on a long member made of a light transmitting material;

an auxiliary optical lattice formed on a second member made of a light transmitting material and movable relative to the first member in a manner to be parallel and adjacent to the main optical lattice;

a light emitter for emitting detecting light to the both optical lattices in a direction from the outer side of the second member to the first member;

a light receiver opposed to the light emitter, interposing therebetween the both optical lattices, for receiving the detecting light transmitted through the both optical lattices, transducing changes in the value of the received light through the repeat of overlappings due to relative movements between the both optical lattices into electrical signals, and outputting the same; and an electronic circuit for processing the electric signals from the light receiver and calculating a relative moving distance between the main optical lattice and the auxiliary optical lattice on the basis of the number of chanes in the value of the received light.

The photoelectric type displacement detecting instrument of the type described has been mounted on machine tools, measuring machines or the like for use, for example. As a matter of course, there has been demand for rendering the displacement detecting instrument compact in size and light in weight.

To meet the demand of rendering the instrument compact in size and light in weight, the present applicant has proposed scales for photoelectric type encoders and photoelectric type encoders as disclosed in Japnese Patent Kokai (Post Exam Publn) Nos, 32125/1985, 32126/1985 and 14287/1985.

These are so-called reflective type photoelectric displacement detecting instruments wherein light transmitted through an index scale is reflected by a main scale.

Accordingly, there has been the problem of that rendering the instrument compact in size and integral forming are still unsatisfactory with the so-called transmission type photoelectric displacement detecting instruments wherein light is transmitted through both the main and auxiliary optical lattices.

As shown in FIG. 22, the light emitter in the compact type encoder as being the above-described photoelectric type displacement detecting instrument has been of such an arrangement that light emitted from a light emitting diode 2 is reflected by a concave spherical surface reflector 3C formed of a concave surface mirror-shaped reflective film to illuminate optical lattices 7A and 8A provided on a first and a second scales 7 and 8, respectively, and reaches a photoelectric transducing element 5.

Now, in the photoelectric type encoder using the above-described concave spherical surface reflector 3C, light emitted from the light emitting diode 2 is diffused in the widthwise direction of the optical lattices 7A and 8A, i.e., the direction of graduations. From this reason, such a problem is presented that rise and fall of the signals obtained from the photoelectric transducing element 5 due to formation of bright and dark portions by the repeat of overlappings of the optical lattices 7A and 8A become unclear.

When a diffusion angle of illuminating light is large as described above, a gap between the optical lattices 7A and 8A in the first scale 7 and the second scale 8, i.e., a lattice interval S cannot be increased.

For example, in the case of an optical lattice having a pitch of 20 $\mu$m, the lattice interval S should be made as low as about 10 $\mu$m or less and accuracy of a guide mechanism for the relative movement between the first and second scales 7 and 8 should be made fairly high, which disadvantageously raise the manufacturing costs.

Here, if a paraxial focal length of the spherical surface of the concave spherical surface reflector 3C is f, and the width of a light emitting portion of the light emitting diode 2 is d, then the diffusion angle is proportional to d/f.

Here, f is proportional to the radius and the magnitude of the diffusion angle is hardly affected by f.

More specifically, diffusion of the illuminating light is principally attributed to the width of the light emitting portion of the light emitting diode 2.

In contrast thereto, it is conceivable that, in order to increase the value of f, the radius of the sphere of the concave spherical reflector 3C is increased, however, this would present the problem of making the photoelectric type encoder large-size.

Furthermore, it is conceivable that, in order to decrease the value of d, the light emitting portion of the light emitting diode 2 is reduced in size, however, this would present the problem of decreasing the value of light emission of the light emitting diode.

The present invention has been developed to obviate the above-described disadvantages of the prior art and has as its object the provision of a transmission type photoelectric displacement detecting instrument wherein the instrument is rendered compact in size, light in weight, and costs are reduced.

Furthermore, the present invention has been developed to obviate the above-described disadvantages of the prior art and has as its another object the provision of a photoelectric type displacement detecting instrument wherein the instrument is not large-sized, a satisfactory value of light emission of the light emitting diode is maintained and adverse influence by diffusion of the illuminating light is minimized.

DISCLOSURE OF THE INVENTION

To achieve the above-described objects, the present invention contemplates that, in a photoelectric type displacement detecting instrument comprising:

a main optical lattice formed on a long first member made of a light transmitting material;

an auxiliary optical lattice formed on a second member made of a light transmitting material and movable relative to the first memeber in a manner to be parallel and adjacent to the main optical lattice;

a light emitter for emitting detecting light to the both optical lattices in a direction from the outer side of the second member to the first member;

a light receiver opposed to the light emitter, interposing therebetween the both optical lattices, for receiving the detecting light transmitted through the both optical lattices, transducing changes in the value of the received light through the repeat the both optical lattices into electric signals, and outputting the same; and an electronic circuit for processing the electric signals from the light receiver and calculating a relative moving distance between the main optical lattice and the auxiliary optical lattice on the basis of the member of changes in the value of the received light; wherein:

the second member has a phase dividing frame for dividing the auxiliarly optical lattice;

the light emitter is integrally provided with a light emitting element disposed at the outer side of either one of the first and second members, a ring-shaped member surrounding the light emitting element and having a height larger in value than the thickness of the light emitting element and a lens member disposed in contact with the outer surface of this ring-shaped member and having a reflector for making parallel the light diffused from the light emitting element and reflecting the same an the direction of the first and second members; and the light receiver is opposed to the light emitting element, interposing therebetween the phase dividing frame, and integrally provided with photoelectric transducing elements provided corresponding in number to the number of division of the phase dividing frame.

To achieve the above-described objects, the present invention contemplates that the ring-shaped member is closely attached to the outer surface of the second member on the side opposite the phase dividing frame.

To achieve the above-described objects, the present invention contemplates that the phase dividing frame is constituted by four block-shaped divisions.

To achieve the above-described objects, the present invention contemplates that the phase dividing frame is constituted by the four block-shaped divisions and the auxiliary optical lattices in the phase dividing frame are shifted in phase by ¼ pitch.

To achieve the above-described objects, the present invention contemplates that, in a photoelectric type displacement detecting instrument comprising:

a main optical lattice formed on a long first member made of a light transmitting material;

an auxiliary optical lattice formed on a second member made of a light transmitting material and movable relative to the first member in a manner to be parallel and adjacent to the main optical lattice;

a light emitter for emitting detecting light to the main and auxiliary optical lattices;

a light receiver opposed to the light emitter, interposing therebetween the both optical lattices, for receiving the detecting light transmitted through the both optical lattices, tranducing changes in the value of the received light through the repeat of overlapping due to relative movements between the both optical lattices into electric signals, and outputting the same; and an electronic circuit for processing the electric signals from the light receiver and calculating a relative moving distance between the main optical lattice and the auxiliary optical lattice on the basis of the member of changes in the value of the received light; wherein the light emitter includes:

a lead frame as being a power supply line;

a light emitting element electrically connected and fixed to this lead frame;

a resin mold made of transparent resin, formed by molding the light emitting element and parts of the lead frame thereinto; and a concave reflector disposed at a side opposite the first member with respect to the light emitting element and being concave toward the light emitting element, for making parallel the light diffused from the light emitting element and reflecting the same in the direction of the first and second member.

To achieve the above-described objects, the present invention contemplates that an end portion of the resin mold on the side opposite the light emitting element is forward into substantially a convex spherical surface and the concave reflector is formed at the rear surface of the convex spherical surface.

To achieve the above-described objects, the present invention contemplates that the concave reflector is formed at the rear side of the convex spherical surface of a lens member jointed to the resin mold.

To achieve the above-described objects, the present invention contemplates that an end face of the resin mold on the side opposite the concave reflector is formed into substantially a convex spherical surface.

To achieve the above-described objects, the present invention contemplates that, in a photoelectric type displacement detecting instrument comprising:

a main optical lattice formed on a first member made of a light transmitting material;

an auxiliary lattice formed on a second member made of a light transmitting material and movable relative to the first member in a manner to be parallel and adjacent to the main optical lattice;

a light emitter for emitting detecting light to the main and auxiliary optical lattices;

a light receiver opposed to the light emitter, interposing therebetween the both optical lattices, for receiving the determining light transmitted through the both optical lattices, transducing changes in the value of the received light through the repeat of overlappings due to relative movements between the both optical lattices into electric signals, and outputting the same; and an electronic circuit for processing the electric signals from the light receiver and calculating a relative moving distance between the main optical lattice and the auxiliary optical lattice on the basis of the number of changes in the value of the received light; wherein the light receiver includes:

a lead frame as being a signal takeoff line;

a plurality of photoelectric transducing elements electrically connected and fixed to the lead frame; and a resin mold made of transparent resin and formed by molding the photoelectric transducing elements and parts of the lead frame thereinto.

To achieve the above-described objects, the present invention contemplates that the photoelectric transducing elements are fixed to a single tip mounting portion of the lead frame and the respective photoelectric transducing elements are wire-bonded to inner lead portions different from one another in the lead frame.

To achieve the above-described objects, the present invention contemplates that the second member is adhesively attached to an end face opposed to the auxiliary optical lattice of the resin mold.

To achieve the above-described objects, the present invention contemplates that, in a photoelectric type displacement detecting instrument comprising:

a main optical lattice formed on a long first member made of a light transmitting material;

an auxiliary optical lattice formed on a second member made of a light transmitting material and movable relative to the first member in a manner to be parallel and adjacent to the main optical lattice;

a light emitter for emitting detecting light to the main and auxiliary optical lattices:

a light receiver opposed to the light emitter, interposing therebetween the both optical lattices, for receiving the detecting light transmitted through the both optical lattices, transducing changes in the value of the received light through the repeat of overlappings due to relative movements between the both optical lattices into electric signals, and outputting the same; and an electronic circuit for processing the electric signals from the light receiver and calculating a relative moving distance between the main optical lattice and the auxiliary optical lattice on the basis of the number of changes in the value of the received light;

wherein the light emitting element is provided with a slit-shaped light emitting portion and the slit is disposed in parallel to the optical lattices.

To achieve the above-described objects, the present invention contemplates that a metal film formed with a slit-shaped opening is deposited on a light emitting surface of the light emitting element of the light emitter, to thereby form the slit-shaped light emitting portion.

To achieve the above-described objects, the present invention contemplates that the width of the slit of the light emitting portion is made to be 100 μm or less.

To achieve the above-described objects, the present invention contemplates that the light emitting element and the light emitting portion are directed in a direction opposite the first and the second members, the light emitter includes a spherical surface-shaped reflective film surrounding the light emitting elements, and the light from the light emitting portion is reflected by the spherical surface-shaped reflective film, and thereafter, is adapted to illuminate the auxiliary optical lattice of the second member and the main optical lattice of the first member.

To achieve the above-described objects, the present invention contemplates that the light emitter is secured to the outer side surface of the second member on the side opposite the surface of the second member, where the auxiliary optical lattice is formed, and the light emitting portion is disposed in a direction opposite the aforesaid outer side surface.

According to the present invention, on the side of the light emitter, the second member or any other light transmitting member is integrally formed with the phase dividing frame, the light emitting element, the ring-shaped member surrounding the light emitting element and the lens member for reflecting the diffused light from the light emitting element to make the same to be parallel rays directed toward the phase dividing frame, and, on the side of the light receiver, the light receiving element is integrally secured to a position opposite the second mamber, so that, due to the above-described integral forming, rendering the instrument compact in size, stability against vibrations, etc. and durability against refuse, dust and the like can be improved.

According to the present invention, the light emitter is constructed such that the light emitting element is previously bonded to the lead frame as being the power source supply line, and thereafter, molded by use of the transparent resin, so that the manufacturing process can be simplified to a considerable extent and the manufacturing cost can be reduced.

Particularly, there is no need of chemically treating a glass substrate to form a wiring pattern, so that expensive equipment can be dispensed with.

Further, the lead frame, the light emitting element and the wire are integrally molded by use of the resin mold, due to the integration, renderiang the instrument compact in size, stability against vibrations, etc. and durability against refuse, dust and the like can be improved.

According to the present invention, the light receiver is constructed such that the photoelectric transducing elements are previously bonded to the lead frame as being the signal takeoff line, and thereafter, molded by use of the transparent resin, so that the manufacturing process can be simplified to a considerable extent and the manufacturing cost can be reduced.

Particularly, there is no need of chemically treating the insulated substrate to form the wiring pattern, so that the expensive equipment can be dispensed with.

Further, the lead frame, the photoelectric elements and the wire are integrally molded by use of the resin mold, so that, due to the integration, rendering the instrument compact in size, stability against the vibrations etc. and durability against the foreign matters, dust and the like can be improved.

According to the present invention, the light emitting portion of the light emitting element is formed into the slit shape and the slit is disposed in parallel to the optical lattices, so that the light emitted from the light emitting portion has low diffusion in the direction of the width of the slit, i.e., the direction in which the optical lattices are provided in parallel to each other. The light is diffused to the height of the optical lattices, i.e., the direction of only the width of graduations, whereby the rise and fall of the height and dark portions of the light received by the light receiving element become clear, so that the measuring accuracy can avoid being lowered.

Accordingly, even if the lattice interval between the optical lattices of the first and the second members is increased, the measuring accuracy can avoid being lowered.

Furthermore, there is no need of rendering the light emitting element compact in size, so that a satisfactory value of illuminant light can be obtained.

Further, when the light emitting element is surrounded by the spherical surface-shaped reflective film, there is no need of increasing the radius of the reflective film.

BRIEF DESCRIPTION OF THE DRAWINGS

FIG. 13 is a perspective view showing the light emitter in the second embodiment;

FIGS. 14(A)-14(C) are plan views showing the manufacturing process of the light emitter in the second embodiment;

FIG. 14(D) is a side view showing the manufacturing process of the light emitter;

BEST MODE FOR CARRYING OUT THE INVENTION

Figure 1:
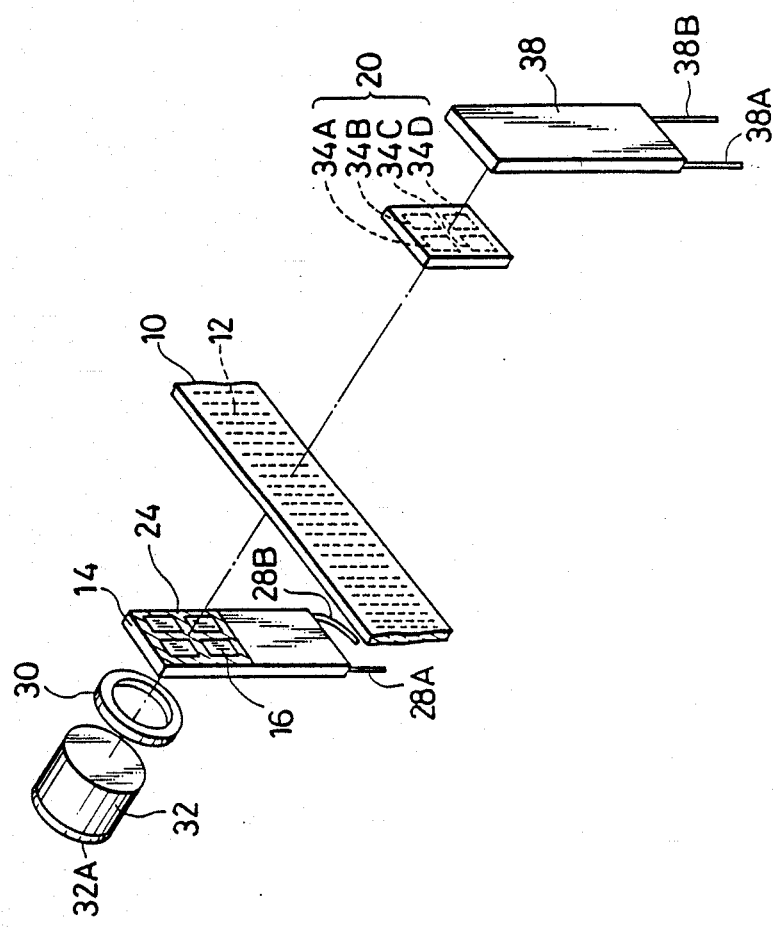
FIG. 1 is a disassembled perspective view showing one embodiment of the photoelectric type displacement detecting instrument according to the present invention.
Figure 2:
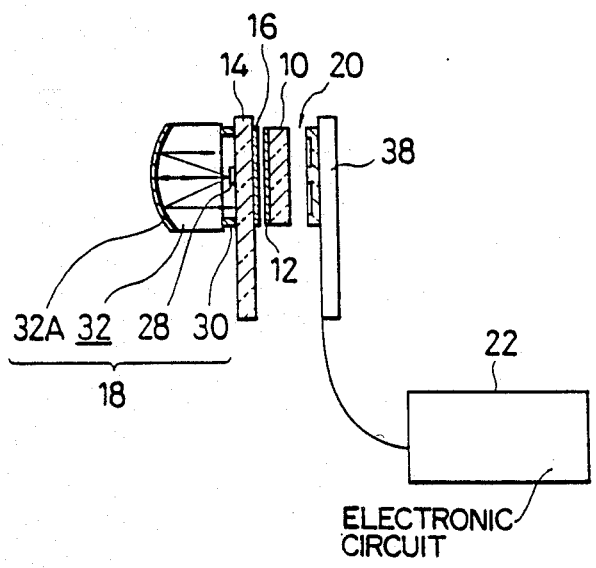
FIG. 2 is a sectional view showing an assembled state of the above embodiment.

Embodiments of the present inventhion will hereunder be described with reference to the accompanying drawings.

According to the embodiment, in a photoelectric type displacement detecting instrument comprising:

a main optical lattice 12 formed on a long first member 10 made of a light transmitting material such as glass;

an auxiliary optical lattice 16 formed on a second member 14 made of a light transmitting material such as glass and movable relative to the first member 10 in a manner to be parallel and adjacent to the main optical lattice 12;

a light emitter 18 for emitting detecting light to the both optical lattices 12 and 16 from the outer side of the second member 14 to the first member 10;

a light receiver 20 opposed to the light emitter 18, interposing therebetween the both optical lattices 12 and 16, for receiving the detecting light transmitted through the both optical lattices 12 and 16, transducing changes in the value of the received light through the repeat of overlappings due to relative movements between the both optical lattices 12 and 16 into electric signals, and outputting the same; and an electronic circuit 22 for processing the electric signals from the light receiver 20 and calculating a relative moving distance between the main optical lattice 12 and the auxiliary optical lattice 16 on the basis of the number of changes in the value of the received light; wherein:

the second member 14 has a phase dividing frame 24 for dividing the auxiliary optical lattice 16 into a plurality of parts;

the auxiliary optical lattice 16 is shifted in positions in accordance with the division of the phase dividing frame 24; and the light emitter 18 is integrally provided with a light emitting element 28 disposed on the outer side surface of the second member 14 on the side opposite the phase dividing frame 24, a ring-shaped member 30 surrounding the light emitting element 28 and having a height larger in value than the thickness of the light emitting element 28 and a lens member 32 disposed in contact with the outer surface of the ring-shaped member 30 and having a reflector 32A for making parallel the light diffused from the light emitting element 28 and reflecting the same toward the phase dividing frame 24; and the light receiver 20 is opposed to the light emitting element 28, interposing therebetween the phase dividing frame 24, and integrally provided therein with photoelectric transducing elements 34A-34D provided corresponding in number to the number of divisions of the phase dividing frame 24.

The main optical lattice 12 of the first member 10 and the auxiliary optical lattice 16 of the second member 14 are formed on opposing surfaces of the first member 10 and the second member 14 so as to be opposed to each other.

The phase dividing frame 24 is formed by means such for example as chromium depositing and etching such that the inner surface of the second member 14, i.e., the surface thereof on the side of the main optical lattice 12 is dividied into four in the block fashion.

The respective divisions of the auxiliary optical lattice 16 as divided by the phase dividing frame 24 are shifted by ¼ pitch in the longitudinal direction of the first member 10.

The light emitting element 28 is secured to a side surface of the second member 14 on the side opposite the auxiliary optical lattice 16 and the phase dividing frame 24 and at a portion corresponding to substantially the center of the phase dividing frame 24.

The ring-shaped member 30 is made of epoxy resin for example and bonded onto the outer surface of the second member 14, centered about the light emitting element 28 and surrounding the same.

The lens member 32 is formed of a cylindrical glass having an outer diameter substantially equal to the outer diameter of the ring-shaped member 30, and the outer peripheral surface of the cylindrical glass is of ground glass.

An end face of the lens member 32 on the side opposite the ring-shaped member 30 is formed into a spherical surface and deposited thereon with a metal film of chromium or the like for example, to thereby form the reflector 32A. The forward end of the lens member 32 is jointed to the ring-shaped member 30.

In other words, the light emitter 18 is integrally formed on the second member 14 together with the phase dividing frame 24, to thereby provide a tip.

The four photoelectric transducing elements 34A-34D are integrally secured to a surface on the side of the first member 10 in a block fashion as opposed to the block fashion of the phase dividing frame 24. Designated at 38 in the drawings is a terminal strip for integrally fixing the photoelectric transducing elements 34A-34D. In other words, the light receiver 20 is integrally formed on the terminal strip 38 to provide a tip.

Denoted at 38A and 38B are terminals from the terminal strip 38. Indicated at 28A and 28B are terminals for supplying power to the light emitting element 28.

Figure 3:
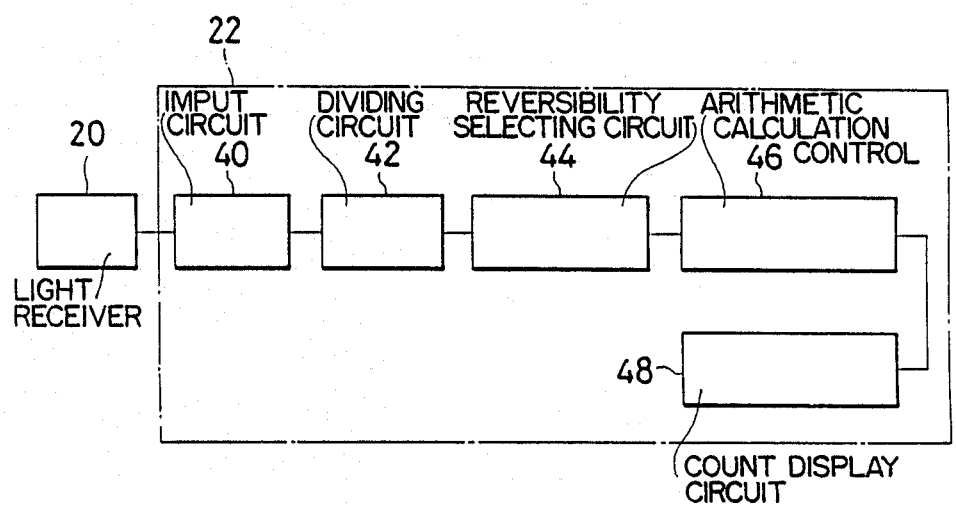
FIG. 3 is a block diagram showing the electronic circuit in the above embodiment.

As shown in FIG. 3, the electronic circuit 22 includes an input circuit 40, a dividing circuit 42, a reversibility selecting circuit 44, and arithmetic calculation control circuit 46 and a count display circuit 48.

Figure 4:
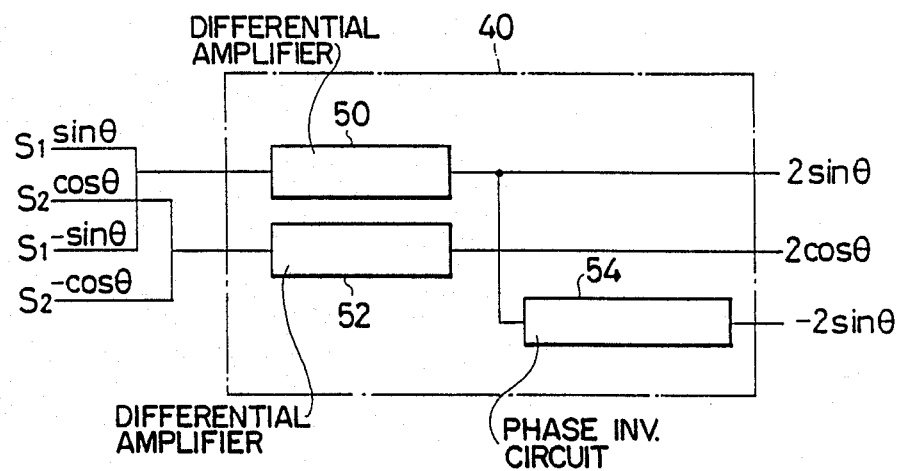
FIG. 4 is a block diagram partially showing the above electronic circuit.

As shown in FIG. 4, the input circuit 40 includes differential amplifiers 50 and 52, into which are inputted signals S1, S2 and S1' and S2' of 0°, −180°, 90° and −270° as obtained from the four photoelectric transducing elements 34A-34D, and a phase inverting circuit 54, is adapted to finally obtain three signals of 0°, 90° and 180° and output these signals to the dividing circuit 42.

In other words, by use of the differential amplifying method, vaues of doubled phases can be offset, adverse influence due to the phasse fluctuations can be relieved and signals having a satisfactory S/N ratio can be obtained.

The dividing circuit 42 is adapted to obtain a signal having a necessary phase difference, from the three signals thus inputted.

The signal from the dividing circuit 42 is adapted to be passed through the reversibility selecting circuit 44, the arithmetic calculation control circuit 46 and the count display circuit 48, and be displayed as a digital value.

In the above embodiment, the light emitter 18 is integrally formed on the second member 14 together with the phase dividing frame 24, to thereby provide a tip.

In other words, the light emitting element 28, the lens member 32 as being a collimator lens, the reflector 32A and the auxiliary optical lattice 16 are integrally formed to provide a single tip.

Furthermore, the light receiver 20 is integrally formed to provide a tip as well.

Accordingly, between the both sides of the light emitter 18 and the light receiver 20, the respective elements can be easily replaced by new ones with no need of adjusting relative positions between the respective elements, and, even with the frequent use, relative displacement between the respective elements can be avoided.

Furthermore, integral forming between the both sides of the light emitter and the light receiver leads to rendering the instrument compact in size.

Further, the tips are formed on the both sides of the light emitter and the light receiver, respectively, foreign matters, dust and the like are excluded from the spaces formed between the respective elements.

Furthermore, in this embodiment, the first and the second phase dividing frames 26 and 24 each form the four divisions in the block fashion, so that the instrument can be rendered compact in size as compared with the case where the auxiliary optical lattice 16 is disposed in parallel to the longitudinal direction of the main optical lattice 12.

Here, examples of manufacturing processes of the light emitter 18 and the light receiver 20 are shown in FIGS. 5 to 8. However, the auxiliary optical lattice 16 is omitted.

Figure 5:
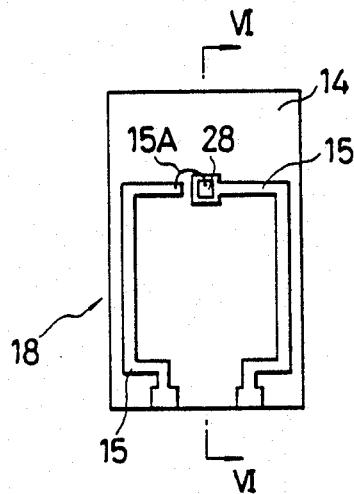
FIG. 5 is a plan view showing a part of the light emitter in the photoelectric type displacement detecting instrument shown in FIG. 2.
Figure 6:
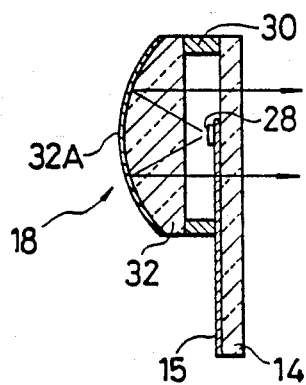
FIG. 6 is a sectional view taken along the line VI—VI in FIG. 5.

In the transmission type photoelectric displacement detecting instrument, as shown in FIGS. 5 and 6, the light emitter 18 to illuminate the optical lattices is manufactured such that a wiring pattern 15 is formed on the second member (glass substrate) 14 by chromium depositing and gold plating, thereafter, the light emitting element (light emitting diode) 28 is secured to a required position on the wiring pattern 15 by die bonding, i.e., with gold-, silicone-foil or the like being clamped therebetween, further, the light emitting element 28 is connected to some other position on the wiring pattern 15 through a wire 15A by wire bonding, further, a ring-shaped member 30 surrounding the light emitting element 28 is jointed to the second member 14, and the lens member 32 is secured to the ring-shaped member 30, thus completing the manufacturing.

Here, an end face of the lens member 32 on the side opposite the light emitting element 28 is formed to provide a convex spherical surface shape, to which is deposited aluminum, to thereby form the concave spherical surface reflector 32A being concave toward the light emitting element 28.

Figure 7:
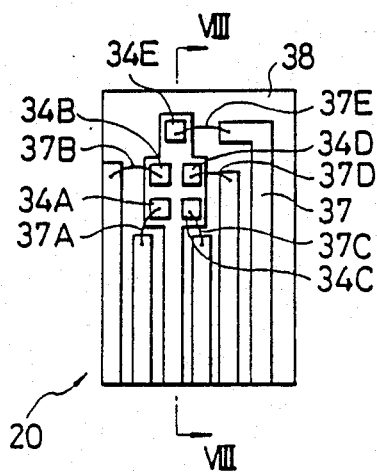
FIG. 7 is a plan view showing a part of the light receiver in the photoelectric type displacement detecting instrument shown in FIG. 2.
Figure 8:
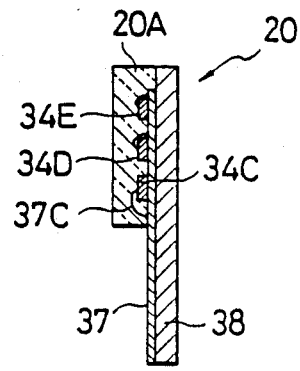
FIG. 8 is a sectional view taken along the line VIII—VIII in FIG. 7.
Figure 9:
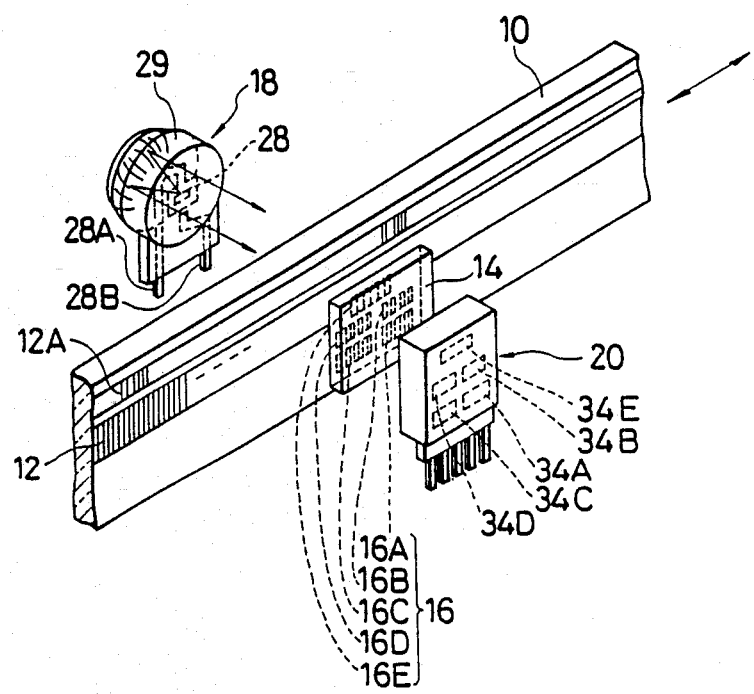
FIG. 9 is a disassembled perspective view showing a second embodiment of the photoelectric type displacement detecting instrument according to the present invention.
Figure 10:
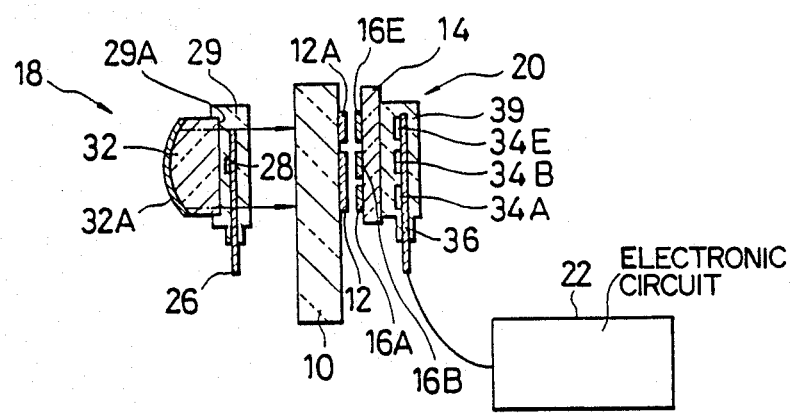
FIG. 10 is a sectional view showing an assembled state of the second embodiment.

Furthermore, in the transmission type photoelectric displacement detecting instrument, as shown in FIGS. 7 and 8, the light receiver 20 to obtain a detection signal is manufactured such that a wiring pattern 37 made of copper or the like is formed on the terminal strip (insulating substrate) 38 made of alumina or the like, thereafter, the photoelectric transducing elements 34A-34E such as photo-transistors are secured to required positions on the wiring pattern 37 by die bonding, i.e., welding with gold-, silicone-foil or the like being clamped therebetween, further, the photoelectric transducing elements 34A-34E are connected to other positions on the wiring pattern 37 through wires 37A-37E by wire bonding, further, parts of the photoelectric transducing elements 34A-34E and of the terminal strip 38 are molded by transparent resin to thereby form a resin mold 20A, and the terminal strip 38 is cut such that the wiring pattern 37 is divided into individual signal take-off lines, thus completing the manufacturing.

Incidentally, the the above embodiment, the light emitter 18 has been integrally secured to the second member 14, however, the present invention need not necessarily be limited to this.

More specifically, the light receiver 20 may be closely attached and fixed to the second member 14 on the side opposite the phase dividing frame 24, and the light emitter 18 may be provided on the first member 10 on the side opposite the second member 14.

The present invention with the above-described arrangement can offer such outstanding advantages that, in the photoelectric type displacement detecting instrument, the light emitter and the light receiver are integrally formed, so that the instrument can be rendered compact in size and reliability can be improved.

The second embodiment of the present invention will hereunder be described with reference to FIGS. 9 to 15. Incidentally, same reference numerals are used to designate same or similar parts as shown in the first embodiment, so that description will be simplified.

According to this second embodiment, in a photoelectric type displacement detecting instrument comprising:

the main optical lattice 12 formed on a long first member made of a light transmitting material such as glass;

the auxiliary optical lattice 16 formed on the second member 14 made of a light transmitting material such as glass and movable relative to the first member 10 in a manner to be parallel and adjacent to the main optical lattice 12;

the light emitter 18 for emitting detecting light to the both optical lattices 12 and 16 from the outer side of the second member 14 to the first member 10;

the light receiver 20 opposed to the light emitter 18, interposing therebetween the both optical lattices 12 and 16, for receiving the detecting light transmitted through the both optical lattices 12 and 16, transducing changes in the value of the received light through the repeat of overlappings due to relative movements between the both optical lattices 12 and 16 into electric signals, and outputting the same; and the electronic circuit 22 for processing the electric signals from the light receiver 20 and calculating a relative moving distance between the main optical lattice and the auxiliary optical lattice 16 on the basis of the number of changes in the value of the received light; the light emitter 18 includes:

a lead frame 26 as being a power source supply line;

the light emitting element 28 electrically connected and fixed to the lead frame 26;

a resin mold 29 made of transparent resin, formed by molding parts of the light emitting element 28 and of the lead frame 26 around the light emitting element 28; and the concave reflector 32A disposed a the side opposite the first member 10 with respect to the light emitting element 28, and concave toward the light emitting element 28, for making parallel the light diffused from the light emitting element 28 and reflecting the same in the direction of the first member 10 and the second member 14.

The resin mold 29 is formed into a disk-shape and provided with a circular recess 29A at an end face thereof on the same side as the light emitting element 28 with respect to the lead frame 26.

Coupled in and bonded to the recess 29A is the lens member 32. Designated at 29B is a ridge for reinforcing the lead frame 26.

The lens member 32 is formed of a cylindrical glass and the outer peripheral surface is of ground glass. An end face of the lens member 32 on the side opposite the light emitting element 28 is formed into a convex spherical surface shape and the concave reflector 32A is formed on the rear surface of the convex spherical surface by use of a reflective film aluminum deposited thereon.

On the first member 10, origin detecting optical lattices 12A each formed of a random pattern are provided in parallel to the main optical lattice 12 and at suitable intervals in the longitudinal direction of the first member 10.

The main optical lattice 12 and the origin detecting optical lattices 12A are formed on a surface of the first member 10 on the side opposite the second member 14.

Furthermore, the auxiliary optical lattice 16 of the second member 14 is formed at the side opposed to the main optical lattice 12 and the origin detecting optical lattices 12A.

The auxiliary optical lattice 16, as shown, is constituted by four reference lattices 16A-16D which are shifted in phase by 90° in order and provided in a block fashion and an origin detecting reference lattice 16E disposed upwardly of the four reference lattices 16A-16D.

The reference lattices 16A-16D are opposed to the main optical lattice 12, and an origin detecting reference lattice 16E is opposed to the origin detecting optical lattice 12A.

Photoelectric transducing elements 34A-34E of the light receiver 20 are opposed to the light emitter 18, interposing therebetween the main optical lattice 12 and the auxiliary optical lattice 16, and provided at positions associated with the reference lattices 16A-16D and the origin detecting reference lattice 16E of the auxiliary optical lattice 16.

The photoelectric transducing elements 34A-34E are mounted to one and a same tip mount 36G in a lead frame 36, electrically connected to five inner lead portions 36A-36E of the lead frame 36 through lead lines 58A-58E wire bonded to the five lead portions 36A-36E, and thereafter, integrally molded together with a portion of the lead frame 36 by a resin mold 39 made of transparent resin and fixed.

The light receiver 20 is bonded and fixed at an end face of the resin mold 39 thereof to an end face of the second member 14 on the side opposite the auxiliary optical lattice 16.

Figure 11:
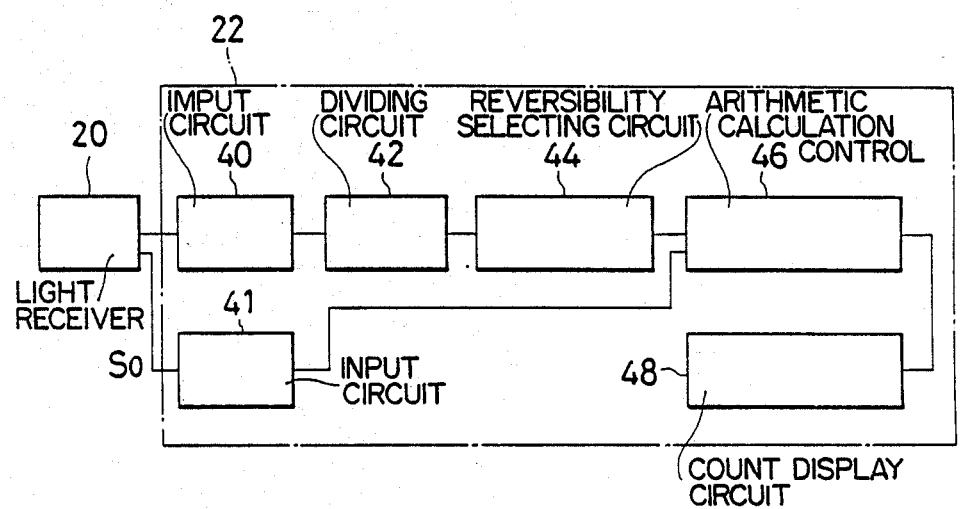
FIG. 11 is a block diagram showing the electronic circuit in the second embodiment.

As shown in FIG. 11, the electronic circuit 22 includes input circuits 40 and 41, a dividing circuit 42, the reversibility selecting circuit 44, and the arithmetic calculation control circuit 46 and the count display circuit 48.

Figure 12:
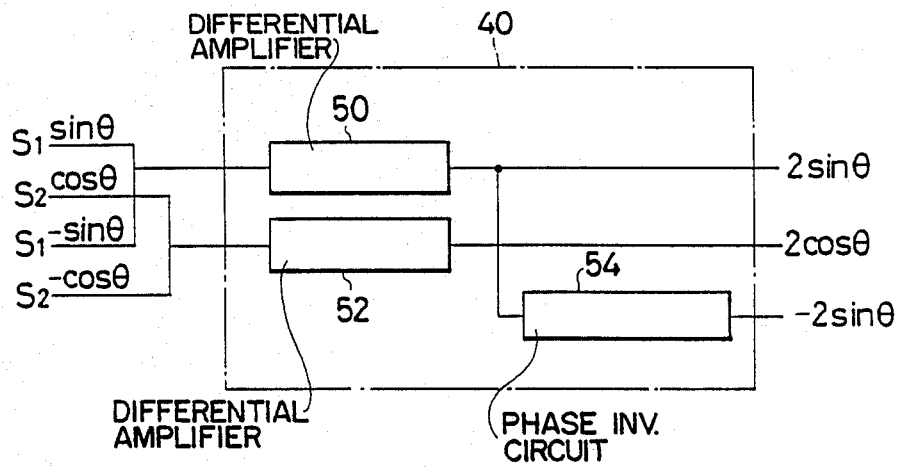
FIG. 12 is a block diagram showing a part of the electronic circuit.
Figure 15:
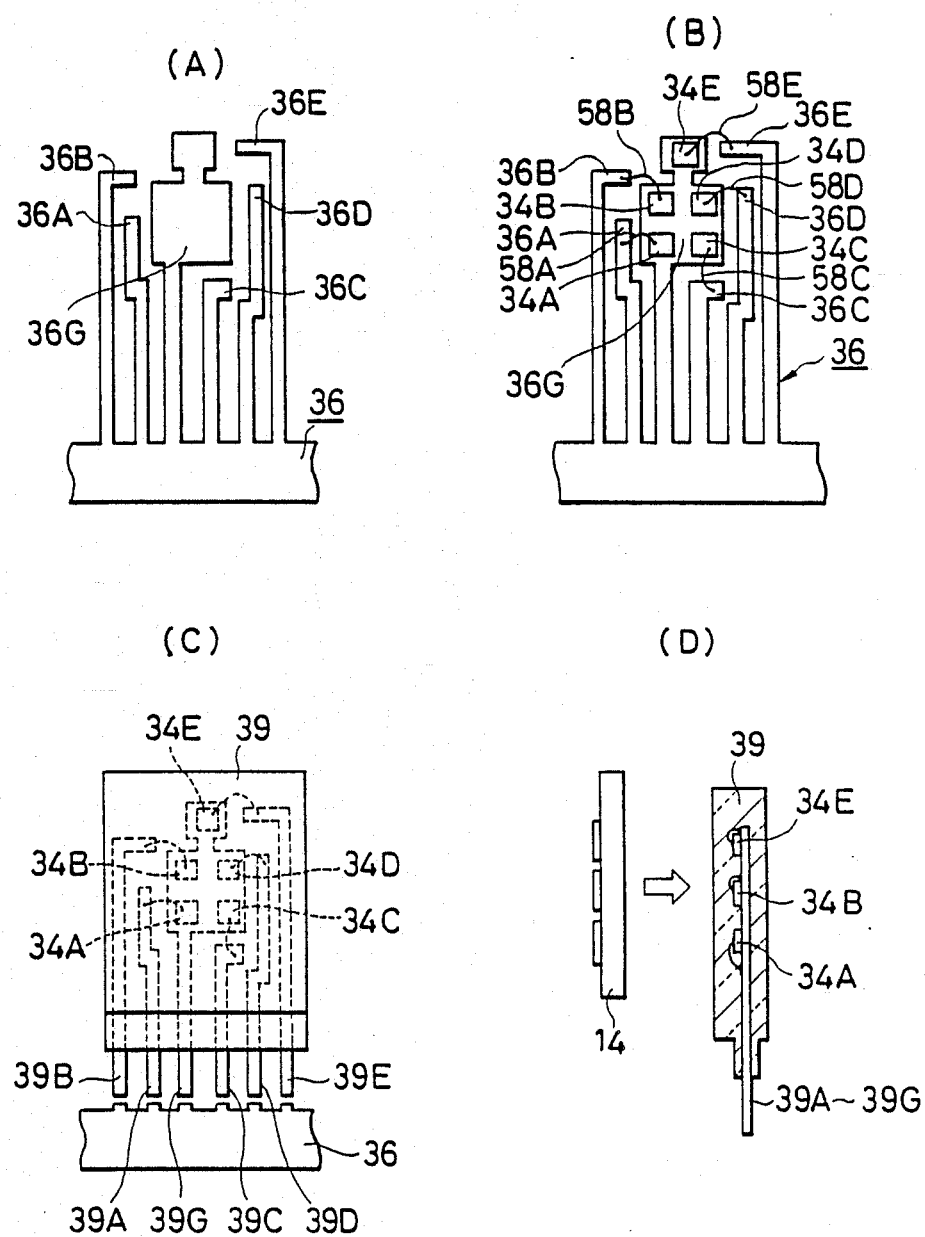
FIGS. 15(A)-15(C) are plan views showing the manufacturing process of the light receiver in the second embodiment.
FIG. 15(D) is a side view thereof.

As shown in FIG. 12, the input circuit 40 includes differential amplifiers 50 and 52, into which are inputted the signals S1, S2 and S1' and S2' of 0° −180°, 90° and −270° which are obtained from the four photoelectric transducing elements 34A-34D and the phase inverting circuit 54, and is adapted to finally obtain the three signals of 0°, 90° and 180° and output the same to the dividing circuit 42.

In other words, by use of the differential amplifying method, values of doubled phases can be offset, adverse influence due to the phase fluctuations can be relieved and signals having a satisfactory S/N ratio can be obtained.

The dividing circuit 42 is adapted to obtain a signal having a necessary phase difference, from the three signals thus inputted.

The signal from the dividing circuit 42 is adapted to be passed through the reversibility selecting circuit 44, the arithmetic calculation control circuit 46 and the count display circuit 48, and be displayed as a digital value.

Furthermore, the input circuit 41 is adapted to obtain an origin detecting signal So from the photoelectric transducing element 34E and output the same to the arithmetic calculation control circuit 46.

The arithmetic calculation control circuit 46 is adapted to make addition or subtraction of signals from the reversibility selecting circuit 44 as referenced from the time of input of an origin detection signal from the input circuit 41 and output the result to the count display circuit 48.

The process of manufacturing the light emitter 18 will hereunder be described with reference to FIGS. 13 and 14.

First, as shown in FIGS. 14(A) and 14(B), the light emitting element 28 is mounted to a tip mounting portion 26G of the lead frame 26 previously formed into a required shape by die bonding. Here, as the lead frame 26, iron, nickel steel or the like having a thickness of 0.25 mm is used for example.

Subsequently, a lead wire 27 is wire bonded between the light emitting element 28 and an inner lead 26H of the lead frame 26.

In this state, as shown in FIG. 14(C), parts of the light emitting element 28, the lead wire 27 and the lead frame 26 are molded by use of transparent resin to thereby form the disk-shaped resin mold 29.

Thus, the resin mold 29 is formed thereon with a circuit recess 29A at the same time.

Subsequently, as shown in FIG. 14(D), a lens member 32, in which the concave reflector 32A is previously formed by aluminum depositing, is coupled and jointed into the recess 29A.

Finally, as shown in FIG. 13, unnecessary portions are cut away from the lead frame 26 and the terminals 28A and 28B which project from the resin mold 29 are formed, thus completing the light emitter 18.

The process of manufacturing the light receiver 20 will hereunder be described.

First, as shown in FIG. 15(A), a lead frame 36, in which portions for mounting five photoelectric transducing elements 34A–34E are formed, is provided. At the lead frame 36, iron, nickel steel or the like having a thickness of 0.25 mm is also used, for example.

As shown in FIG. 15(B), the photoelectric transducing elements 34A–34E are mounted to the single tip mounting portion 36G of the lead frame 36 by die bonding.

Subsequently, lead wires 58A–58E are wire bonded between the photoelectric transducing elements 34A–34E and inner lead portions 36A–36E of the lead frame 36, which are associated with the photoelectric transducing elements 34A–34E.

Then, as shown in FIG. 15(C), parts of the photoelectric transducing elements 34A–34E, of the lead wires 58A–58E and of the lead frame 36 are molded by use of transparent resin to thereby form the resin mold 39.

Subsequently, unnecessary portions are cut away from the lead frame 36, and terminals 39A–39G, which project from the resin mold 39, are formed, thus completing the light receiver 20.

As shown in FIG. 15(D), the second member 14 is jointed to the front surface of the light receiver 20 thus completed so as to be formed integrally.

The terminals 39A–39G are connected to the electronic circuit 22.

In this embodiment, the process of manufacturing the light emitter 18 can be simplified to a considerable extent, and the light emitter 18, terminals 28A and 28B, and lead wire 27 can be stably and integrally formed into a tip, as compared with the light emitter in the conventional photoelectric type displacement detecting instrument.

Further, the lens member 32 formed thereon with the concave reflector 32A can be more stably maintained.

Furthermore, the lead frame 26 is used and directly mounted thereto with the light emitter 28, so that expensive chemical treatment equipment for forming the wiring pattern can be dispensed with, thus permitting reduction of the manufacturing cost to a considerable extent.

Further, the lens member 32 is separately manufactured and jointed to the resin mold 29 during the final process, so that shaping accuracy of the lens member 32 can be improved.

In this embodiment, the process of manufacturing the light receiver 20 can be simplified to a considerable extent as compared with the light receiver in the conventional photoelectric type displacement detecting instrument.

Furthermore, the lead frame 36 is used and the photoelectric transducing elements 34A–34E are directly mounted to the lead frame 36, so that an expensive chemical treatment equipment for forming the wiring pattern can be dispensed with, thus permitting reduction of the manufacturing cost to a considerable extent.

Furthermore, the light receiver 20 is integrally bonded to the second member 14, so that further rendering the instrument compact in size and improved stability can be achieved.

Figures 16, 17:
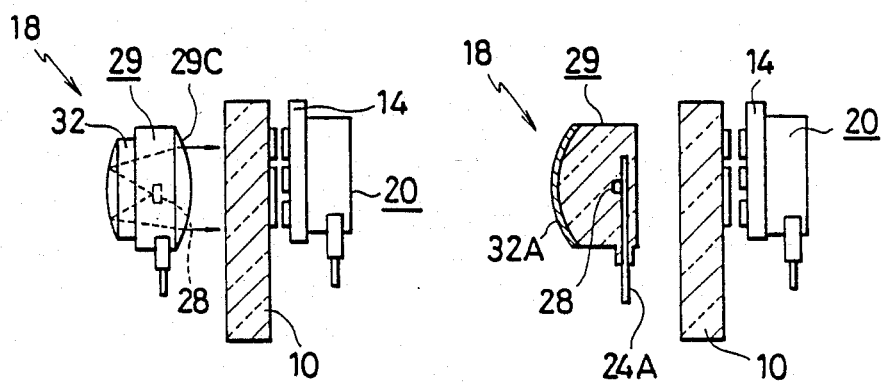
FIGS. 16-18 are sectional views showing a third to fifth embodiments of the present invention.

The third embodiment of the present invention as shown in FIG. 16 will hereunder be described.

In this embodiment, the end face of the resin mold 29, which is opposed to the first member 10, is formed to provide a convex spherical surface 29C. With this arrangement, the illustrating light diffused from the light emitting element 28 and reflected by the concave reflector 32A is further refracted by the convex spherical surface 29C.

Accordingly, the illuminating light diffused from the light emitting element 28 can be more reliably turned into parallel rays, i.e., perpendicularly intersecting the main optical lattice 12 and the auxiliary optical lattice 16.

The rest of the arrangement is similar to the second embodiment, so that same reference numerals are used to designate the same or similar parts in order to simplify description.

In the above embodiment, the light emiter 18 is of such an arrangement that the lens member 32 having the concave reflector 32A is bonded to the resin mold 29 incorporating therein the light emitting element 28 and the part of the lead frame 26, and the lead wire 27, however, the present invention need not necessarily be limited to this, and, as shown in FIG. 17 for example, the lens member may be formed on a portion of the resin mold 29.

In this case, the lens member is made of transparent resin, which is continuously and integrally formed at the same time when the light emitting element and the like molded in.

In the case of this embodiment, the concave reflector 32A is formed at the end portion of the resin mold, so that shaping accuracy is slightly lowered as compared with the case where the concave reflector is formed by glass. However, the manufacturing cost can be decreased and the manufacturing process can be shortened.

Furthermore, in the above embodiments, the light emitter 18 is opposed to the second member 14, interposing therebetween the first member 10, however, the present invention need not necessarily be limited to this, and such an arrangement may be adopted that the light emitter 18 can emit the illuminating light to the main optical lattice 12 of the first member 10 and the auxiliary optical lattice 16 of the second member 14 from one direction.

Figure 18:
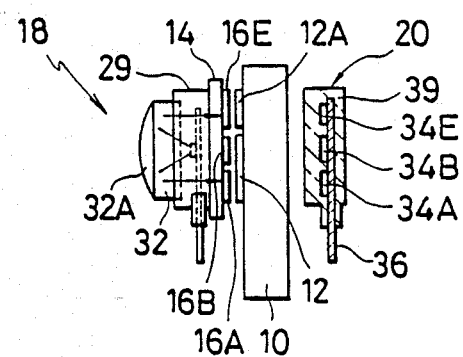

Accordingly, as shown in FIG. 18 for example, the second member 14 may be interposed between the light emitter 18 and the first member 10.

Here, the second member 14 is stationary and the first member 10 is reciprocatory in the longitudinal direction thereof, whereby the light emitter 18 is integrally secured to the second member 14. In this case, the light emitter 18 and the second member 14 are formed into one tip.

In the above embodiment, the light emitting element 28, the lens member 32 as being the collimator lens and the concave reflector 32A are formed into one tip.

Furthermore, the light receiver 20 is formed into a tip as well.

Accordingly, between the both sides of the light emitter 18 and the light receiver 20, the respective elements can be easily replaced by new ones with no need of adjusting relative positions between the respective elements, and, even with the frequent use, relative displacement between the respective elements can be avoided.

Furthermore, integral forming between the both sides of the light emitter and the light receiver leads to rendering the instrument compact in size.

Further, the tips are formed on the both sides of the light emitter and the light receiver, respectively, foreign matters, dust and the like are excluded from spaces formed between the respective elements.

The present invention with the above-described arrangement can offer such outstanding advantages that the process of manufacturing the light emitter can be shortened and the manufacturing cost can be reduced to a considerable extent and reliability can be further improved.

The sixth embodiment of the present invention will hereunder be described with reference to FIGS. 19 to 21.

Figure 19:
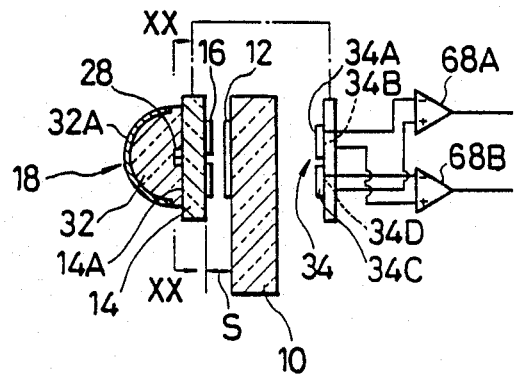
FIG. 19 is a sectional view, partially including a block diagram, showing a sixth embodiment of the present invention.
Figure 20:
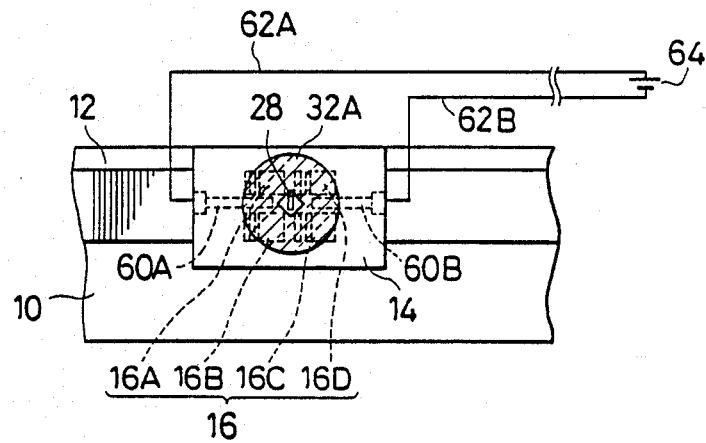
FIG. 20 is a sectional view taken along the line XX—XX in FIG. 15.
Figure 21:
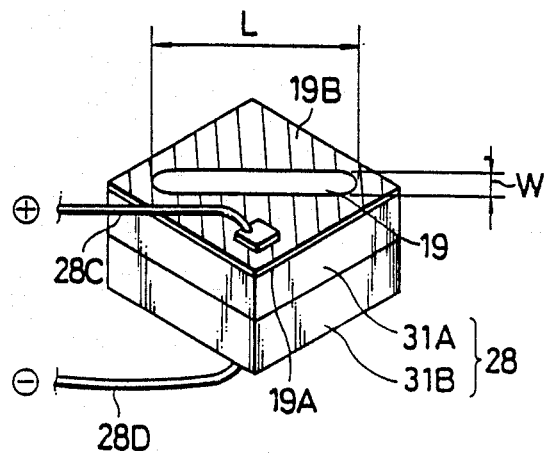
FIG. 21 is a perspective view enlargingly showing the light emitting in the sixth embodiment.
Figure 22:
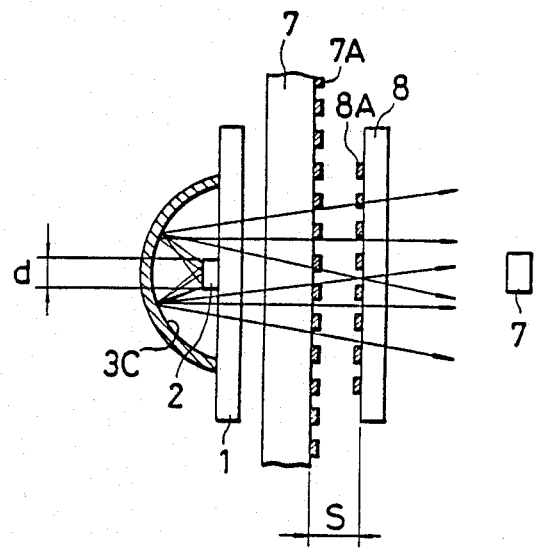
FIG. 22 is a sectional view showing a conventional photoelectric type encoder.

As shown in FIGS. 19 to 21, according to this embodiment, the photoelectric type displacement detecting instrument comprising:

the first member 10 formed with graduations constituted by the main optical lattice 12 having a regular pitch, the graduations being arranged parallel in the longitudinal direction thereof;

the second member 14 movable relative to the first member 10 in the longitudinal direction thereof, formed with graduations constituted by the auxiliary optical lattice 16 having the same regular pitch as the main optical lattice 12 and having the graduations thereof opposed to the graduations of the first member 10;

the light emitter 18 having the light emitting element 28, for illuminating the both optical lattices 12 and 16 of the first and second members 10 and 14, which are opposed to each other, in one direction; and the light receiver 20 opposed to the light emitter 18, interposing therebetween the optical lattices 12 and 16 of the first and the second members 10 and 12, for receiving the light from the light emitter 18, which is transmitted through the optical lattices 12 and 16 of these first and second members 10 and 14; wherein the light emitting element 28 has a slit-shaped light emitting portion 19 and this slit is disposed in parallel to the optical lattices 12 and 16.

As shown in FIG. 21, the light emitting element 28 is deposited at a light emitting surface 19A thereof with a metal film 19B having a slit-shaped opening, to thereby form the aforesaid slit-shaped light emitting portion 19.

The light emitting element 28 is formed by jointing a P type GA As 31A to a N type Ga As 31B, each of which is of a regular square having a side of 400 $\mu$m. The slit-shaped light emitting portion 19 has a width W of 50 $\mu$m and a length L of 350 $\mu$m and is placed on diagonal lines of Ga As substrates 31A and 31B.

Designated at 28C and 28D are lead wires, one 28C of the lead wires being connected to the metal film 19B additionally functioning as an electrode and the other 28D being connected to a surface on the side opposite the metal film 19B.

As shown in FIG. 20, the first member 10 is made to be a so-called main scale in a photoelectric type encoder.

In contrast thereto, the second member 14 is formed short and made to be a so-called index scale and the auxiliary lattice 16 thereof is constituted by four auxiliary optical lattices 16A–16D which are shifted in phase by 90° in turn.

These four auxiliary optical lattices 16A–16D are provided in a block fashion, i.e., as shown in FIG. 1 at positions where these lattices can be overlapped with the main optical lattice 12 of the first member 10.

In contrast thereto, the light emitting element 28 is positioned such that the slit-shaped light emitting portion 19 thereof is located at the center position of the four auxiliary optical lattices 16A–16D and in parallel to these auxiliary optical lattices 16A–16D.

Designated at 60A and 60B in FIG. 20 are transparent conductive films formed on the surface of the second member, for feeding power to the light emitting element 28. These transparent conductive films 60A and 60B are connected to a power source 64 through lead wires 62A and 62B.

The light emitter 18 includes the light emitting element 28 being mounted to the outer side surface 14A of the second member 14 on the side opposite the surface where the auxiliary optical lattice 16 is formed, and having the light emitting portion 19 thereof directed in a direction opposite the aforesaid outer side surface 14A and a spherical surface-shaped reflector 32A surrounding the light emitting element 28, and is adapted to illuminate the auxiliary optical lattice 16 of the second member 14 and the main optical lattice 12 of the first member 10 after the light from the light emitting portion 19 is reflected by the spherical surface-shaped reflector 32A.

The spherical surface-shaped reflector 32A is formed such that an epoxy adhesive is formed into the lens member 32 having a hemispherical surface by use of a hemispherical surface-shaped mold, aluminum is deposited on the hemispherical surface of the lens member 32, to thereby form the hemispherical reflector.

Furthermore, the light receiver 20 is constituted by four photoelectric transducing elements 34A–34D corresponding to the four auxiliary optical lattices 16A–16D.

Denoted at 68A and 68B in FIG. 19 are difference arithmetic units for calculating differences between electric signals obtained from the four photoelectric transducing elements 34A–34D.

In the above embodiment, when the pitches of the optical lattices 12 and 16 were each set to 20 $\mu$m, the interval between the optical lattices, i.e., the lattice interval S was able to be set to about 40 $\mu$m.

More specifically, heretofore, when the pitches of the optical lattices have been set to 20 $\mu$m, the lattice interval S has been able to be set to 10 $\mu$m at the maximum. In the case of the above embodiment, the lattice interval S was able to be quadrupled as compared with the conventional one.

Further, even in the case where the radius of the spherical surface-shaped reflector 32A was made to be equal to the conventional one, the value of the received light by the light receiver 20 was not decreased at all as compared with the conventional case, and the S/N ratio of the obtained signals was substantially equal to the conventional one.

Incidentally, in the above embodiment, both the P type Ga As 31A and the N type Ga As 31B, which form the light emitting element 28, are of regular squares, however, these may be of rectangles.

However, in the case where these P type and N type substrates are formed into regular squares and the slit-shaped light emitting portion 19 is formed on the diagonal lines of these substrates, there is such an advantage that a light emitting efficiency to applied current is high.

Furthermore, the light emitting element 28 utilizes a simiconductor substrate of gallium arsenic, however, this may be any other semiconductor substrate such as Ga P, Ga Al As or the like.

Further, the P type and N type substrates may be put upside down, and black paint may be applied to the side surfaces of these substrates.

Furthermore, the above embodiment is of such an arrangement that the auxiliary optical lattice 16 of the second member 14 is constituted by the four auxiliary optical lattices 16A–16D, which are shifted in phase by 90° in turn, however, the present invention need not necessarily be limited to this, and, in the case of moiré fringe type for example, it suffices that the pitch of the auxiliary optical lattice 16 of the second member 2 is substantially equal to the pitch of the main optical lattice 12 of the first member 10, and further, one optical lattice is used in the second member and signals changed in phase by 90° in turn can be obtained depending upon the position of the single optical lattice.

Moreover, in the above embodiment, the first member 10 and the second member 14 are linear type encoders, respectively, however, the present invention need not necessarily be limited to this, and the present invention should naturally be applicable to a rotary encoder.

Furthermore, in the above embodiment, the light from the light emitting element 28 is reflected by the spherical surface-shaped reflector 32A, and thereafter, illuminates the optical lattices 12 and 16, however, the present invention is applicable to such an arrangement that the optical lattices 12 and 16 are directly illiminated by the light emitted from the light emitting element 28 without providing the spherical surface-shaped reflector 32A.

The present invention with the above-described arrangement can offer such advantages that diffusion of light illuminating the optical lattices of the first and second members in the widthwise direction of the optical lattices, i.e., the direction of the graduations can be controlled without rendering the light emitting portion of the light emitting element compact in size.

INDUSTRIAL APPLICABILITY

The present invention with the above-described arrangement is useful in that the transmission type photoelectric detecting instrument can be made further compact in size and light in weight, the manufacturing cost can be reduced and reliability can be improved.

We claim:

1. A photoelectric type displacement detecting instrument comprising:
   a main optical lattice (12) formed on a first member (10) made of a light transmitting material;
   an auxiliary optical lattice (16) formed on a second member (14) made of a light transmitting material and movable relative to said first member (10) in a manner to be parallel and adjacent to said main optical lattice (12);
   a light emitter (18) for emitting detecting light to both optical lattices (12 and 16) from the outer side of said second member (14) to said first member (10);
   a light receiver (20) opposed to said light emitter (18), interposing therebetween both optical lattices (12 and 16), for receiving said detecting light transmitted through the both optical lattices (12 and 16), transducing changes in the value of said received light through the repeat of overlappings due to relative movements between both optical lattices (12 and 16) into electric signals, and outputting same; and
   an electronic circuit (22) for processing said electric signals from said light receiver (20) and calculating a relative moving distance between said main optical lattice (12) and said auxiliary optical lattice (16) on the basis of the number of changes in the value of said received light; wherein:
   said second member (14) has a phase dividing frame (24) for dividing said auxiliary optical lattice (16);
   said light emitter (18) is integrally formed with a light emitting element (28) disposed at the outer side of either one of said first member (10) and said second member (14), a ring-shaped member (30) surrounding said light emitting element (28) and having a height larger in value than the thickness of said light emitting element (28) and a lens member (32) being in contact with the outer surface of said ring-shaped member (30) and having a reflector (32A) for making parallel the light diffused from said light emitting element (28) and reflecting same toward said phase dividing frame (24); and
   said light receiver (20) is opposed to said light emitting element (28), interposing therebetween said phase dividing frame (24), and integrally formed therein with photoelectric transducing elements (34A–34D) provided corresponding in number to the number of division of said phase dividing frame (24).

2. A photoelectric type displacement detecting instrument as set forth in claim 1, wherein said ring-shaped member (30) is closely attached to said second member (14) on the side opposite said phase dividing frame (24).

3. A photoelectric type displacement detecting instrument as set forth in claim 2, wherein said phase dividing frame (24) is formed of four block-shaped divisions.

4. A photoelectric type displacement detecting instrument as set forth in claim 2, wherein said phase dividing frame (24) is formed of four block-shaped divisions, and parts of said auxiliary optical lattice (16) in said phase dividing frame (24) are shifted in phase from one another by ¼ pitch.

5. A photoelectric type displacement detecting instrument as set forth in claim 1, wherein said phase dividing frame (24) is formed of four block-shaped divisions.

6. A photoelectric type displacement detecting instrument as set forth in claim 1, wherein said phase dividing frame (24) is formed of four block-shaped divisions, and parts of said auxiliary optical lattice (16) in said phase dividing frame (24) are shifted in phase from one another by ¼ pitch.

7. A photoelectric type displacement detecting instrument comprising:

a main optical lattice (12) formed on a first member (10) made of a light transmitting material;

an auxiliary optical lattice (16) formed on a second member (14) made of a light transmitting material and movable relative to said first member (10) in a manner to be parallel and adjacent to said main optical lattice (12);

a light emitter (18) for emitting detecting light to said main optical lattice (12) and said auxiliary optical lattice (16) from the outer side of said second member (14) to said first member (10);

a light receiver (20) opposed to said light emitting element (28), interposing therebetween both optical lattices (12 and 16), for receiving said detecting light transmitted through both optical lattices (12 and 16), transducing changes in the value of said received light through the repeat of overlappings due to relative movements between both optical lattices (12 and 16) into electric signals, and outputting the same; and an electronic circuit (22) for receiving said electric signals from said light receiver (20) and calculating a relative moving distance between said main optical lattice (12) and said auxiliary optical lattice (16) on the basis of the number of changes in the value of the received light; wherein said light emitter (18) includes a light emitting element (28), which is provided with a slit-shaped light emitting portion (19) and said slit is disposed in parallel to said optical lattices (12 and 16), wherein said light emitting element (28) comprises a regular square shaped light emitting surface (19A) and said slit shaped light emitted portion (19) is placed on a diagonal line of said light emitting surface (19A), and wherein:

said light emitting element (28) and said light emitting portion (19) are disposed in a direction opposite said first member (10) and said second member (14);

said light emitter (18) has a spherical surface-shaped reflective film surrounding said light emitting element (28); and the light from said light emitting portion is reflected by said spherical surface-shaped reflective film, and thereafter, illuminates said auxiliary optical lattice (16) of said second member (14) and said main optical lattice (12) of said first member (10).

8. A photoelectric type displacement detecting instrument as set forth in claim 7, wherein said light emitter (18) is secured to the outer side surface (14A) of said second member (14) on the side opposite the surface of said second member (14), where said auxiliary optical lattice (16) is formed, and said light emitting portion (19) is disposed in a direction opposite said outer side surface (14A).

9. A photoelectric type displacement detecting instrument comprising:

a main optical lattice (12) formed on a first member (10) made of a light transmitting material;

an auxiliary optical lattice (16) formed on a second member (14) made of a light transmitting material and movable relative to said first member (10) in a manner to be parallel and adjacent to said main optical lattice (12);

a light emitter (18) from emitting detecting light to said main optical lattice (12) and said auxiliary optical lattice (16) from the outer side of said second member (14) to said first member (10);

a light receiver (20) opposed to said light emitting element (28), interposing therebetween both optical lattices (12 and 16), for receiving said detecting light transmitted through both optical lattices (12 and 16), transducing changes in the value of said received light through the repeat of overlappings due to relative movements between both optical lattices (12 and 16) into electric signals, and outputting the same; and an electronic circuit (22) for receiving said electric signals from said light receiver (20) and calculating a relative moving distance between said main optical lattice (12) and said auxiliary optical lattice (16) on the basis of the number of changes in the value of the received light; wherein said light emitter (18) includes a light emitting element (28), which is provided with a slit-shaped light emitting portion (19) and said slit is disposed in parallel to said optical lattices (12 and 16), wherein said light emitting element (28) comprises a regular square shaped light emitting surface (19A) and said slit shaped light emitting portion (19) is placed on a diagonal line of said light emitting surface (19A), wherein a metal film (19B) formed with a slit-shaped opening is deposited on said light emitting surface (19A) of said light emitting element (28), to thereby form the slit-shaped light emitting portion (19), and wherein:

said light emitting element (28) and said light emitting portion (19) are disposed in a direction opposite said first member (10) and said second member (14);

said light emitter (18) has a spherical surface-shaped reflective film surrounding said light emitting element (28); and the light from said light emitting portion is reflected by said spherical surface-shaped reflective film, and thereafter, illuminates said auxiliary optical lattice (16) of said second member (14) and said main optical lattice (12) of said first member (10).

10. A photoelectric type displacement detecting instrument as set forth in claim 9, wherein said light emitter (18) is secured to the outer side surface (14A) of said second member (14) on the side opposite the surface of said second member (14), where said auxiliary optical lattice (16) is formed, and said light emitting portion (19) is disposed in a direction opposite said outer side surface (14A).

11. A photoelectric type displacement detecting instrument comprising:

a main optical lattice (12) formed on a first member (10) made of a light transmitting material;

an auxiliary optical lattice (16) formed on a second member (14) made of a light transmitting material and movable relative to said first member (10) in a manner to be parallel and adjacent to said main optical lattice (12);

a light emitter (18) for emitting detecting light to said main optical lattice (12) and said auxiliary optical lattice (16) from the outer side of said second member (14) to said first member (10);

a light receiver (20) opposed to said light emitting element (28), interposing therebetween both optical lattices (12 and 16), for receiving said detecting light transmitted through both optical lattices (12 and 16), transducing changes in the value of said received light through the repeat of overlappings due to relative movements between both optical lattices (12 and 16) into electric signals, and outputting the same; and an electronic circuit (22) for receiving said electric signals from said light receiver (20) and calculating a relative moving distance between said main optical lattice (12) and said auxiliary optical lattice (16) on the basis of the number of changes in the value of the received light; wherein said light emitter (18) includes a light emitting element (28), which is provided with a slit-shaped light emitting portion (19) and said slit is disposed in parallel to said optical lattices (12 and 16), wherein said light emitting element (28) comprises a regular square shaped light emitting surface (19A) and said slit shaped light emitting portion (19) is placed on a diagonal line of said light emitting surface (19A), wherein the width (W) of the slit of said light emitting portion (19) is made to be 100 $\mu$m or less, and wherein:

said light emitting element (28) and said light emitting portion (19) are disposed in a direction opposite said first member (10) and said second member (14);

said light emitter (18) has a spherical surface-shaped reflective film surrounding said light emitting element (28); and the light from said light emitting portion is reflected by said spherical surface-shaped reflective film, and thereafter, illuminates said auxiliary optical lattice (16) of said second member (14) and said main optical lattice (12) of said first member (10).

12. A photoelectric type displacement detecting instrument as set forth in claim 11, wherein said light emitter (18) is secured to the outer side surface (14A) of said second member (14) on the side opposite the surface of said second member (14), where said auxiliary optical lattice (16) is formed, and said light emitting portion (19) is disposed in a direction opposite said outer side surface (14A).

13. A photoelectric type displacement detecting instrument comprising:

a main optical lattice (12) formed on a first member (10) made of a light transmitting material;

an auxiliary optical lattice (16) formed on a second member (14) made of a light transmitting material and movable relative to said first member (10) in a manner to be parallel and adjacent to said main optical lattice (12);

a light emitter (18) for emitting detecting light to said main optical lattice (12) and said auxiliary optical lattice (16) from the outer side of said second member (14) to said first member (10);

a light receiver (20) opposed to said light emitting element (28), interposing therebetween both optical lattices (12 and 16), for receiving said detecting light transmitted through both optical lattices (12 and 16), transducing changes in the value of said received light through the repeat of overlappings due to relative movements between both optical lattices (12 and 16) into electric signals, and outputting the same; and an electronic circuit (22) for receiving said electric signals from said light receiver (20) and calculating a relative moving distance between said main optical lattice (12) and said auxiliary optical lattice (16) on the basis of the number of changes in the value of the received light; wherein said light emitter (18) includes a light emitting element (28), which is provided with a slit-shaped light emitting portion (19) and said slit is disposed in parallel to said optical lattices (12 and 16), wherein said light emitting element (28) comprises a regular square shaped light emitting surface (19A) and said slit shaped light emitting portion (19) is placed on a diagonal line of said light emitting surface (19A), wherein a metal film (19B) formed with a slit-shaped opening is deposited on said light emitting surface (19A) of said light emitting element (28), to thereby form the slit-shaped light emitting portion (19), wherein the width (W) of the slit of said light emitting portion (19) is made to be 100 $\mu$m or less, and wherein:

said light emitting element (28) and said light emitting portion (19) are disposed in a direction opposite said first member (10) and said second member (14);

said light emitter (18) has a spherical surface-shaped reflective film surrounding said light emitting element (28); and the light from said light emitting portion is reflected by said spherical surface-shaped reflective film, and thereafter, illuminates said auxiliary optical lattice (16) of said second member (14) and said main optical lattice (12) of said first member (10).

14. A photoelectric type displacement detecting instrument as set forth in claim 13, wherein said light emitter (18) is secured to the outer side surface (14A) of said second member (14) on the side opposite the surface of said second member (14), where said auxiliary optical lattice (16) is formed, and said light emitting portion (19) is disposed in a direction opposite said outer side surface (14A).

* * * * *